Nov. 20, 1962   J. W. O'NEAL ETAL   3,064,587
VEHICLE PUSHER FOR VEHICLE WASHER
Filed June 26, 1959   2 Sheets-Sheet 1
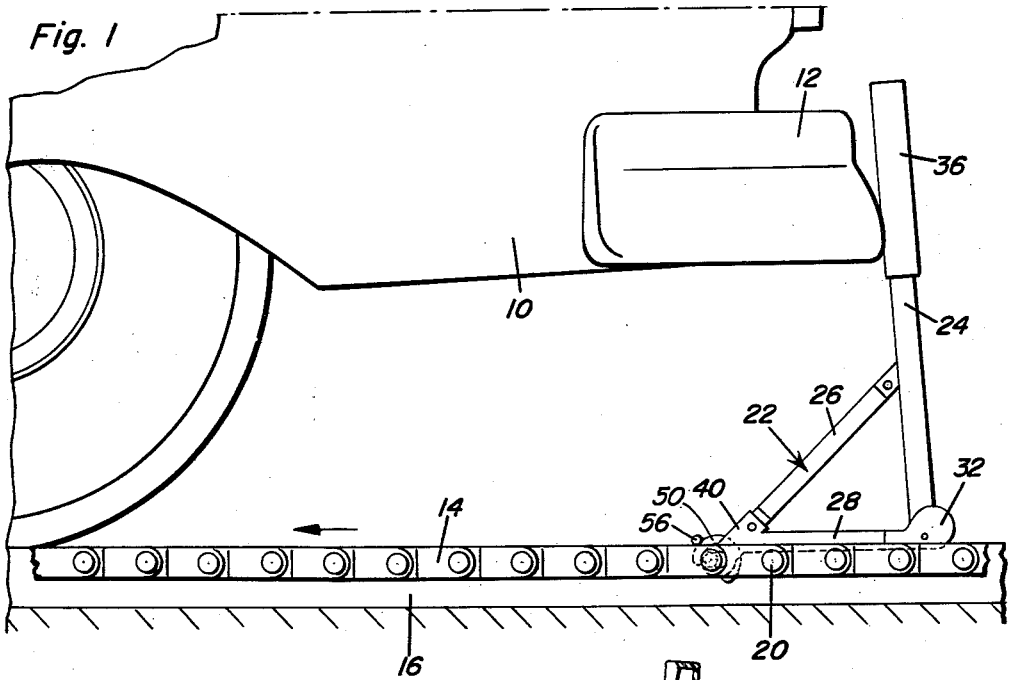
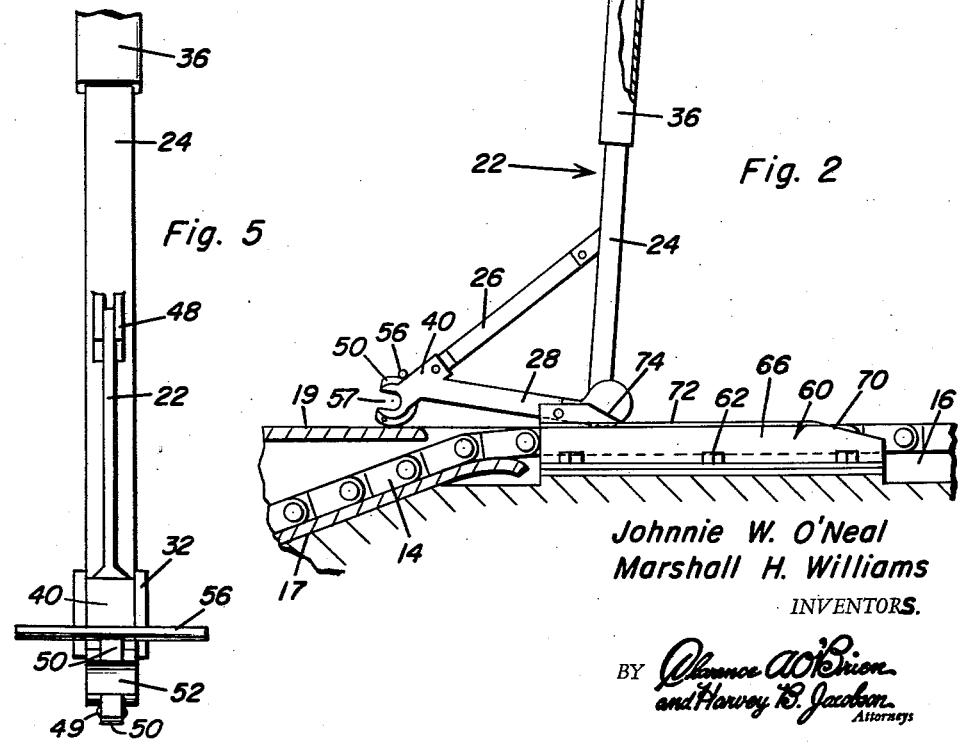
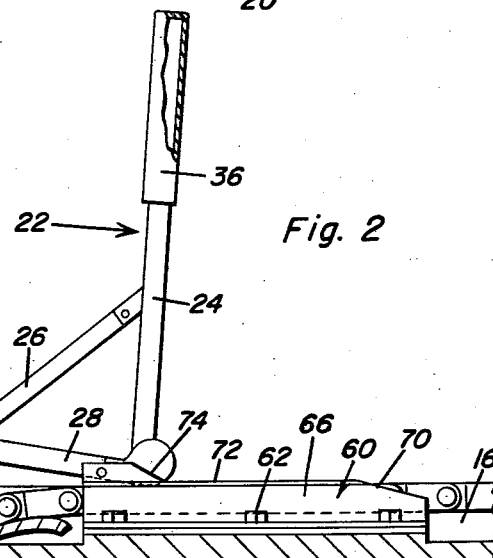
Johnnie W. O'Neal
Marshall H. Williams
INVENTORS.

Nov. 20, 1962   J. W. O'NEAL ETAL   3,064,587
VEHICLE PUSHER FOR VEHICLE WASHER
Filed June 26, 1959   2 Sheets-Sheet 2
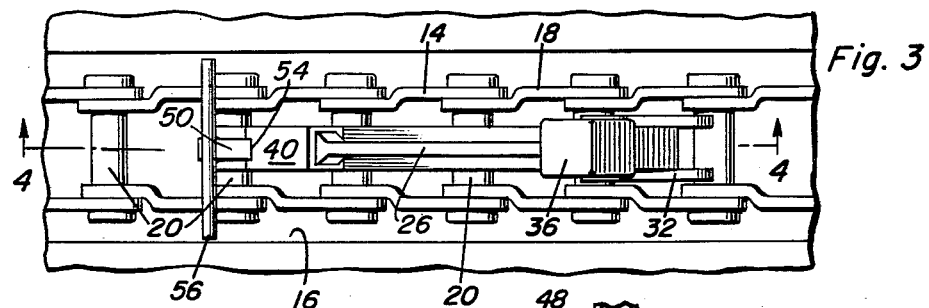
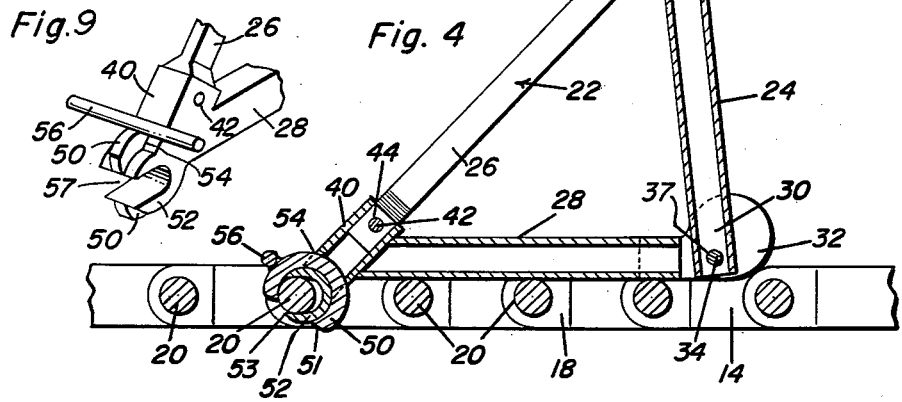
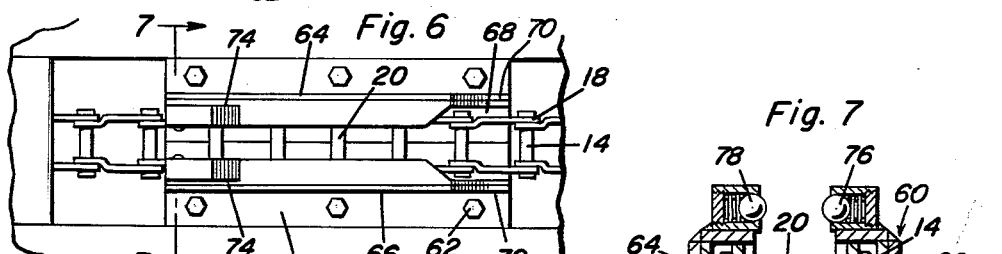
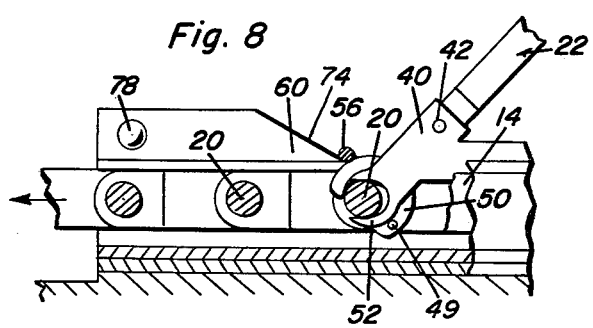
Johnnie W. O'Neal
Marshall H. Williams
INVENTORS.

United States Patent Office 3,064,587
Patented Nov. 20, 1962

3,064,587
VEHICLE PUSHER FOR VEHICLE WASHER
Johnnie W. O'Neal and Marshall H. Williams, Odessa, Tex., said Williams assignor to said O'Neal
Filed June 26, 1959, Ser. No. 823,127
12 Claims. (Cl. 104—172)

This invention relates to improvements in motor vehicle car washers and more particularly to the pusher by which the motor vehicle is moved along during the washing procedure.

An object of the invention is to provide a vehicle pusher adapted to be used in connection with a conventional drive chain of an automatic automobile washing system. The vehicle pusher engages the rear part of the motor vehicle, preferably the rear bumper and pushes the car through the designed path of travel for the car washer whether it is automatic or semi-automatic or non-automatic. The type of car washer and washing procedure is immaterial insofar as the pusher of this invention is concerned.

The improvement described herein deals with the pusher itself and its cooperative relationship with a conventional chain at the lower part of the automobile (or truck), washer equipment. The pusher actually propels the motor vehicle by a pushing operation rather than by pulling or by using grapples or clamps between the chain and vehicles.

The pusher in accordance with this invention is not only considerably more easily handled but also is safer both for personnel and for the motor vehicles being washed. One of the important features of the invention is found in a shearpin assembly which fails in case of difficulties in moving the motor vehicle through the washing cycle so that damage to the motor vehicle caused by pushing the motor vehicle is completely avoided.

Another feature of the invention is its ease of application and use. The pusher automatically releases from the drive chain at the proper time in the procedure, and the pusher remains erect so that an attendant may simply lift it and carry it to the initial starting position in preparedness for another cycle of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a part of a conventional motor vehicle washing apparatus but equipped with a pusher in accordance with the invention, this view showing the pusher as it would appear in use.

FIGURE 2 is a fragmentary sectional elevational view showing the pusher release device which separates the pusher from the chain at the end of a cycle of pushing operation.

FIGURE 3 is a top plan view of the pusher as it would appear on a part of a conventional chain.

FIGURE 4 is a vertical sectional view taken on the line 4—4 of FIGURE 3.

FIGURE 5 is a front elevational view of the pusher.

FIGURE 6 is a top view of the pusher release device.

FIGURE 7 is a vertical sectional view taken on the line 7—7 of FIGURE 6.

FIGURE 8 is an enlarged fragmentary sectional view showing a part of the pusher as it approaches the release device.

FIGURE 9 is a perspective view showing the mechanism for releasably engaging a cross pin of a link chain.

In the accompanying drawings there is illustrated a part of a conventional motor vehicle 10 having a rear bumper 12. A conventional chain 14 is shown recessed in a trough 16 in the floor of the motor vehicle washing area, and the chain diagrammatically represents a part of numerous manufacturers' makes of conventional washing machines. The chain 14 has articulated side links 18 and cross pins 20 attached to the side links.

Pusher 22 is very simple in construction. It includes an upright lever 24, a link 26 and a base 28. The base 28 may be made solid or tubular, preferably the latter for lightness, and has a pivot connection with the lower end of lever 24. The pivot connection is established by a pair of spaced ears 32 on base 28 to which transverse pivot pin 34 is secured. The pivot pin extends through an aperture 37 at the lower end of lever 24. The upper end of lever 24 has a pad 36 thereon, for instance a rubber or plastic sleeve simply fitted over the upper end of the lever. Pad 36 contacts the rear bumper 12 of the motor vehicle and has the purpose of preventing scratches and scars during the pushing operation.

The forward end of base 28 is rigidly secured to an angulated tubular socket 40. As shown in FIGURE 4, lever 24, link 26 and base 28 form a triangular construction. The lower end of link 26 is disposed in tubular socket 40 and is connected thereto by means of a transverse shearpin or releasable means 42 secured to socket 40 and to link 26 by being attached to the socket 40 and passing through an aperture 44 in the portion of link 26 that occupies socket 40. The upper end of link 26 is attached by another shearpin 46 to an ear or bracket 48 welded or otherwise secured to lever 24 intermediate the upper and lower ends thereof.

The lower end of socket 40 depends beneath the base 28 and is integrally connected to a bearing member 52 which is substantially C-shaped in cross-section. The length of the bearing 52 in a horizontal direction is equal to the width of the socket 40, and as shown in FIGURE 9 the ends of the bearing are coplanar with the sides of the socket. The central portion of the extreme lower end of the socket 40 has formed therein an arcuate recess 54 which is rectangular in cross-section and surrounds and opens upon the outer surface of the center of the bearing 52. A C-shaped socket 50 is journaled on the central portion of the outer surface of the bearing 52 and extends through the arcuate slot 54 formed in the lower end of socket 40. A latch release pin 56 is welded to the upper surface of the socket 50 and the pin is of sufficient length to bridge the side links of chain 14. A rivet 49 extends through the bottom portion of socket 50 and the heads of this rivet extend beyond the outer side surfaces of the socket. It is thus apparent, that the socket 50 may rotate on the bearing member 52 and is prevented from axially moving thereon by the sides of slot 54. The pin 56 and rivet 49 act as stops so as to prevent the ends of the socket 50 from passing through the slot. As shown in FIGURE 9, when the socket 50 is rotated on bearing 52 so that pin 56 abuts socket 40, the openings in socket 50 and bearing 52 become aligned so as to provide an opening 57 for permitting passage of one of the chain cross pins 20 into and out of the bearing 52. When the socket 50 is rotated in a counter-clockwise direction from the FIGURE 9 or FIGURE 4 position, the upper portion of socket 50 closes the opening 57 and rivet 49 contacts the back edge of socket 40 for preventing excess movement of socket 50. Also, pin 56 may abut the upper surface of chain 14 when the socket 50 is closed in relation to bearing 52.

A clamp release device 60 is fixed on opposite sides of chain 14, for instance it is attached by bolts 62 to the floor of the trough 16 or adjacent to the trough 16. The release device 60 has a pair of sides 64 and 66 defining a longitudinal passageway 68 through which chain 14 operates. The front edges of sides 64 and 66 are slanted to form ramps 70, and the intermediate parts of the sides are horizontal, and there are final ramps 74 adjacent to the opposite ends of sides 64 and 66. Ball detents 76 and 78 are carried by the ramps 74 and are adapted to grip against the sides of base 28 to hold the pusher 22 erect after it is released by release device 60 from chain 14.

In use and operation, the pusher seats upon several cross pins 20 (FIGURE 4), and the clamp structure at the lower end of socket 40 is opened by rotating socket 50 clockwise until the entrance 51 thereof is aligned with the entrance 53 of bearing 52 so as to provide opening 57. A selected cross pin 20 is then capable of fitting into the clamp and by rotation of the socket 50 counterclockwise, the clamp is closed, i.e. it latches on one of the cross pins 20.

As the chain 14 is propelled, the lever 24 pushes the motor vehicle 10 throughout the washing cycle of the motor vehicle. As the clamp approaches device 60, the transverse pin 56 rides up ramps 70 and onto platform 72 as shown in FIG. 2, and then up ramps 74 during which the socket 50 is rotated to a position at which the pin 56 strikes the front edge of socket 40 (FIGURES 2 and 4) thereby opening the clamp. When the clamp is open, the chain 14 is capable of riding down chain guide 17 which is a conventional part of the mechanism in the motor vehicle washer so that the clamp structure can ride upon surface 19 which is a covering for the end of trough 16. At this part of the operational sequence the ball detents 76 and 78 engage the rear part of the base 28 and hold the lever 24 erect so that an attendant may pick it up and carry it back to the starting position for reuse.

At any time during the pushing procedure, should the motor vehicle 10 become bound or stuck for one reason or another, the pusher will apply only a safe force. When the pushing force exceeds a safe operating level, one or both of the shearpins 42 and 46 will break and the lever 24 tilt back to an approximately horizontal position at which it will ride safely and harmlessly beneath the motor vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pusher for a motor vehicle and adapted for use with a chain of a motor vehicle car washing apparatus, said pusher comprising a lever, a base, said base adapted to rest on the chain, a pivot connection attaching said lever to said base, a link connected to said lever and to said base and constituting a tension member, releasable means responsive to tension force beyond a predetermined level for attaching said link operatively between said base and said lever, a clamp connected to said base and releasably engageable with said chain, said clamp adapted to engage with a cross pin of the chain and including a socket, a bearing, said socket movably disposed on said bearing, said bearing and socket each having entrances adapted to align upon adjustment of said socket with reference to said bearing.

2. A pusher for a motor vehicle and adapted for use with a chain of a motor vehicle car washing apparatus, said pusher comprising a lever, a base, said base adapted to rest on the chain, a pivot connection attaching said lever to said base, a link connected to said lever and to said base and constituting a tension member, releasable means responsive to tension force beyond a predetermined level for releasing said link between said base and said lever, a clamp connected to said base and releasably engageable with said chain, said clamp adapted to engage with a cross pin of the chain and including a socket and a bearing, said socket movably disposed on said bearing, said bearing and socket each having entrances adapted to align upon adjustment of said socket with reference to said bearing a release device mounted adjacent to said chain, and means connected with said socket and engageable with said release device for operating said socket with reference to said bearing to actuate said clamp to the open position.

3. A pusher for a motor vehicle and adapted for use with a chain of a motor vehicle car washing apparatus, said pusher comprising a lever, a base, said base adapted to rest on the chain, a pivot connection attaching said lever to said base, a link connected to said lever and to said base and constituting a tension member, releasable means responsive to tension force beyond a predetermined level for attaching said link operatively between said base and said lever, a clamp connected to said base and releasably engageable with said chain, said clamp adapted to engage with a cross pin of the chain and including a socket, a bearing, said socket movably disposed on said bearing, said bearing and socket each having entrances adapted to align upon adjustment of said socket with reference to said bearing, a release device mounted adjacent to said chain, and means connected with said socket and engageable with said release device for operating said socket with reference to said bearing to actuate said clamp to the open position in response to forward motion of said socket and base, and means for retaining said lever in an erect position after it is released from the chain.

4. In a motor vehicle washing apparatus which has a chain, means to push a motor vehicle in coordination with the movement of said chain, said vehicle pushing means including a lever, a base forming no part of the chain, means pivotally connecting said lever to said base, a tension link, releasable means operatively connecting said tension link between said base and lever so that upon application of a force onto said lever beyond a predetermined level to pivotally swing to a lowered position, releasable level said releasing means releases, thereby enabling said coupling means connected between said base and said chain for attaching said base to said chain.

5. In a motor vehicle washing apparatus which has a chain, means to push a motor vehicle in coordination with the movement of said chain, said vehicle pushing means including a lever, a base connectable to the chain by automatically releasable means only, means pivotally connecting said lever to said base, a tension link, means releasable on overload operatively connecting said tension link between said base and lever so that upon application of a force onto said lever beyond a predetermined level said releasing means release thereby enabling said lever to pivotally swing to a lowered position, releasable coupling means connected between said base and said chain for attaching said base to said chain, the last mentioned releasable means including a clamp engageable with a cross pin of the chain, and a release device to operate said clamp adjacent to the chain.

6. The combination of claim 5 wherein there are means at said release device for holding said lever in an erect position after said clamp is released.

7. The combination of claim 5 wherein the first-mentioned releasable connecting means includes at least one shearpin.

8. A vehicle washing device comprising a movable chain, pushing means including a base member on the chain and a lever projecting from the base member and chain, means securing the lever to the base and normally preventing relative movement between the lever and base, coupling means on the pushing means for connecting it to a cross pin of the chain and means for automatically releasing the coupling means after the chain has travelled a predetermined distance whereby the pushing means will be disconnected from the chain.

9. A device as defined in claim 8 wherein the means for automatically releasing the coupling means includes a fixed abutment for contacting and operating the coupling means to a released position as it is moved by said chain.

10. A pusher for a vehicle adapted for use with a chain of a motor vehicle car washing apparatus, said pusher comprising a lever, a base adapted to be carried by the chain, a pivot connection attaching said lever to said base, a tension member connected between the lever and the base by a connecting means, said connecting means including a releasable means yieldable on tension forces beyond a predetermined level to permit the lever to pivot on its pivotal connection to said base.

11. A pusher for a motor vehicle and adapted for use with a chain of a motor vehicle car washing apparatus, said pusher comprising a lever, a base separate from the chain and forming no part thereof, said base adapted to rest on the upper surface of the chain, a pivot connection attaching said lever to said base, a link connected to said lever and to said base and constituting a tension member, the link connection including releasable means responsive to tension force beyond a predetermined level for operatively releasing said link connection between said base and said lever.

12. A pusher for a motor vehicle and adapted for use with a chain of a motor vehicle car washing apparatus, said pusher comprising a lever, an independent base forming no part of the chain, said base adapted to rest on the chain, a pivot connection attaching said lever to said base, a link connected to said lever and to said base and constituting a tension member, releasable means responsive to tension force beyond a predetermined level for releasing said link operatively between said base and said lever, and a coupling means connected to said base, said coupling means adapted to releasably connect the pusher to a portion of the chain, and releasing means on the coupling means for automatically releasing the coupling means from the chain after the chain has traveled a predetermined distance.

References Cited in the file of this patent

UNITED STATES PATENTS

| | | |
|---|---|---|
| 797,610 | Shaefer | Aug. 22, 1905 |
| 1,226,156 | Wilson | May 15, 1917 |
| 1,428,679 | Caswell | Sept. 12, 1922 |
| 1,720,785 | Edler | July 16, 1929 |
| 1,740,014 | Hawkins | Dec. 17, 1929 |
| 1,744,536 | Faverty | Jan. 21, 1930 |
| 1,867,678 | Rayburn | July 19, 1932 |
| 2,040,353 | Wilson | May 12, 1936 |
| 2,100,253 | Irwin et al. | Nov. 23, 1937 |
| 2,665,128 | Guffey | Jan. 5, 1954 |